United States Patent [19]
Tjebben

[11] 3,958,156
[45] May 18, 1976

[54] VACUUM INTERRUPTER METAL-CLAD SWITCHGEAR VERTICALLY ELEVATABLE WITHIN COMPARTMENT

[75] Inventor: John O. Tjebben, Wauwatosa, Wis.

[73] Assignee: Allis-Chalmers Corporation, Milwaukee, Wis.

[22] Filed: Oct. 21, 1974

[21] Appl. No.: 516,808

[52] U.S. Cl. ............................ 317/103; 200/50 AA; 200/144 B; 200/153 SC
[51] Int. Cl.² ................ H02B 11/18; H01H 33/42; H01H 9/22
[58] Field of Search ..... 200/50 AA, 144 B, 153 SC, 200/153 G, 153 H, 148 D, 148 F; 317/103, 99

[56] References Cited
UNITED STATES PATENTS

| | | | |
|---|---|---|---|
| 1,862,169 | 6/1932 | Wood | 317/103 |
| 1,866,333 | 7/1932 | Wood | 317/103 |
| 1,929,983 | 10/1933 | MacNeil | 317/103 |
| 2,057,084 | 10/1936 | Cornell et al. | 317/103 |
| 2,175,854 | 10/1939 | Rugg | 317/103 |
| 2,414,555 | 1/1947 | Pierson et al. | 200/50 AA |
| 2,600,304 | 6/1952 | Krida | 317/103 |
| 2,826,722 | 3/1958 | Zautner et al. | 317/103 |
| 3,080,459 | 3/1963 | Delaney | 317/103 X |
| 3,527,911 | 8/1970 | Sharp | 317/103 X |
| 3,597,556 | 8/1971 | Sharp et al. | 200/144 B |
| 3,691,332 | 9/1972 | Sharp | 200/50 AA X |
| 3,728,508 | 4/1973 | Netzel | 200/144 B X |
| 3,735,065 | 5/1973 | Brandt, Jr. et al. | 317/103 X |

*Primary Examiner*—James R. Scott
*Attorney, Agent, or Firm*—Robert C. Jones

[57] ABSTRACT

A drawout switchgear having an in-line vacuum circuit breaker carried on a truck which is insertable into a compartment of the switchgear; the truck carrying the breaker is inserted into the compartment and the truck and breaker as a unit is elevated into the connected position; in connected position each vacuum interrupter is enclosed in its own stationary porcelain housing which also contains the primary disconnects that feed vertically directly to the main horizontal bus and up through long porcelain insulators to outgoing compartments at the rear of circuit breaker compartment.

23 Claims, 18 Drawing Figures

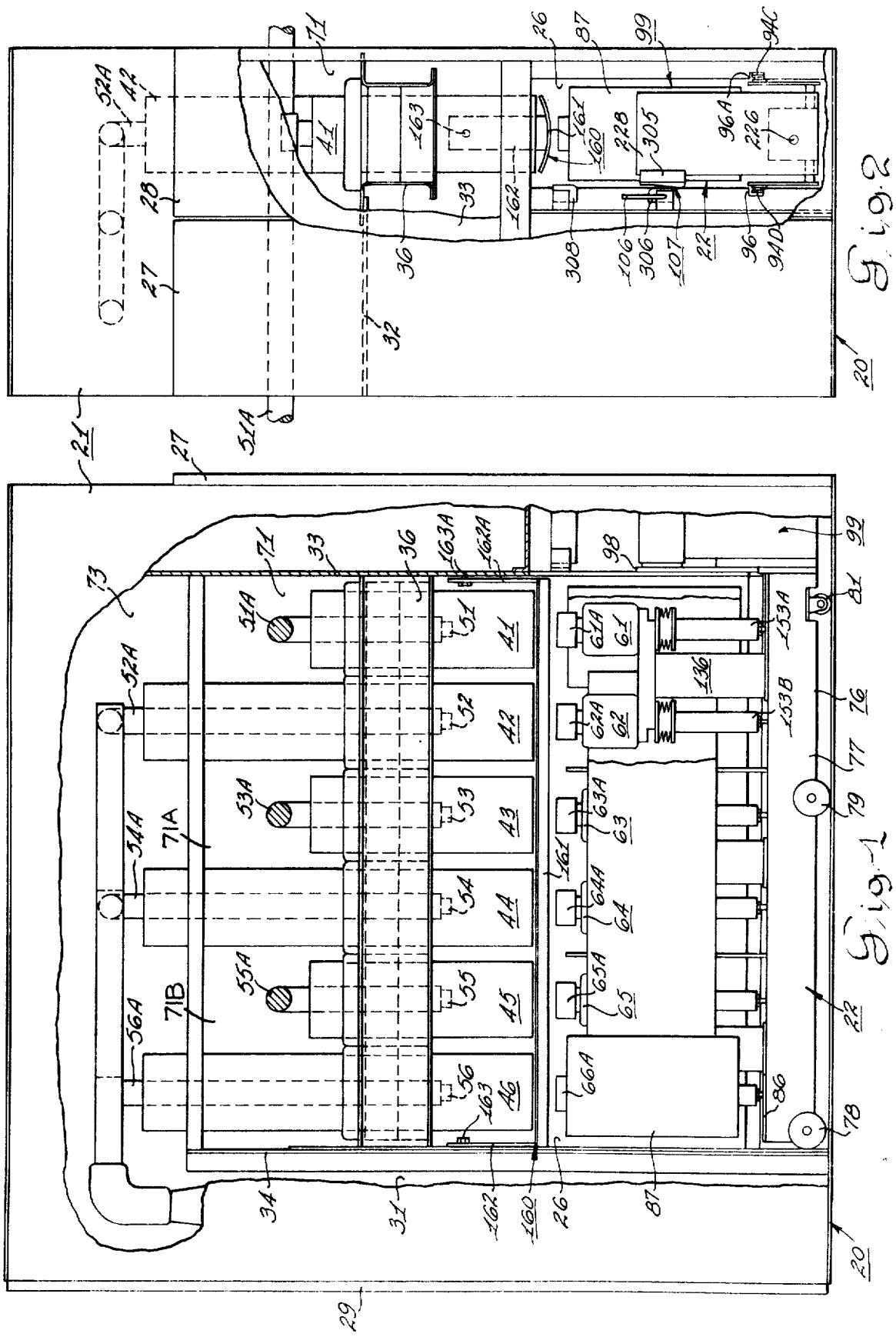

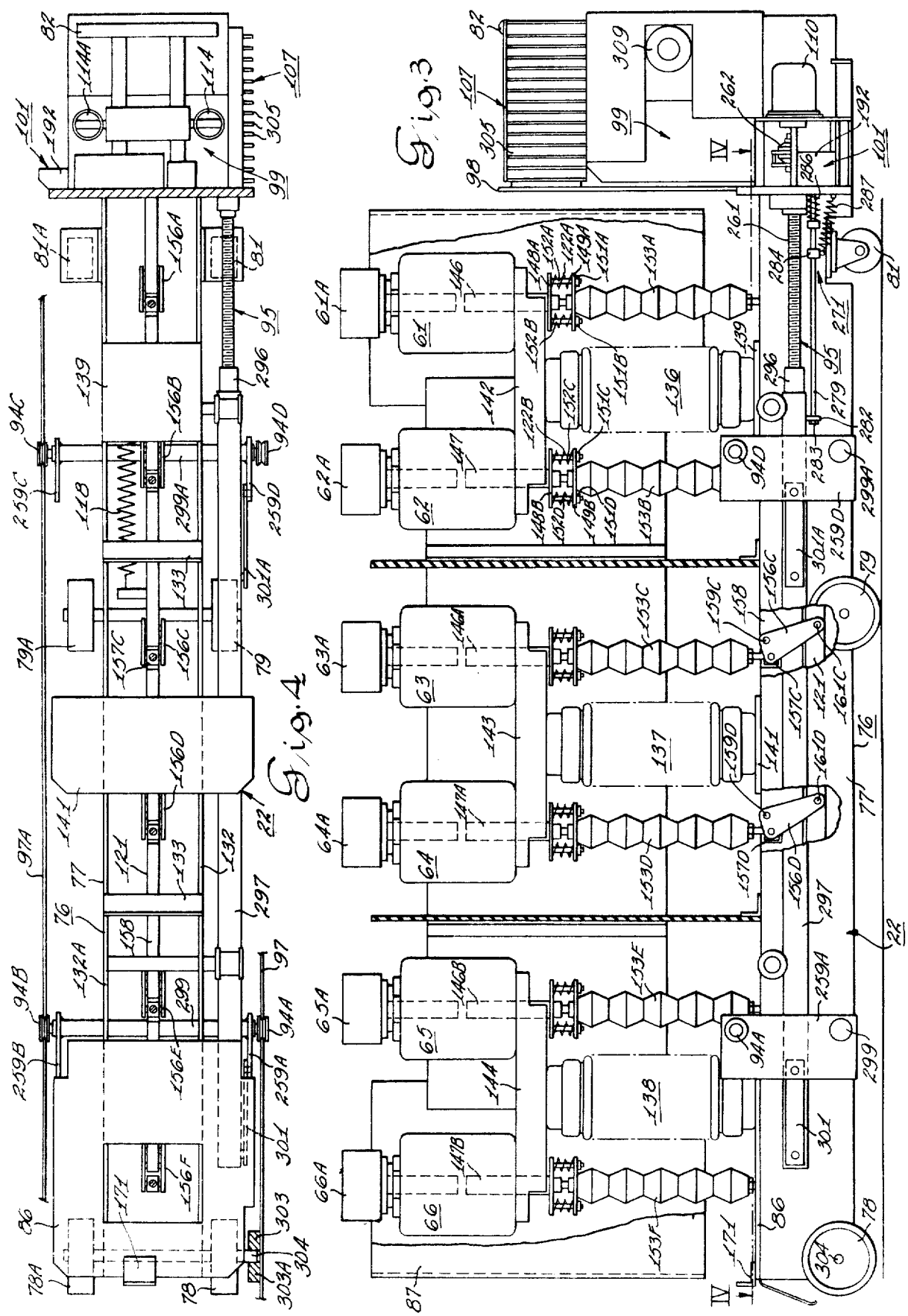

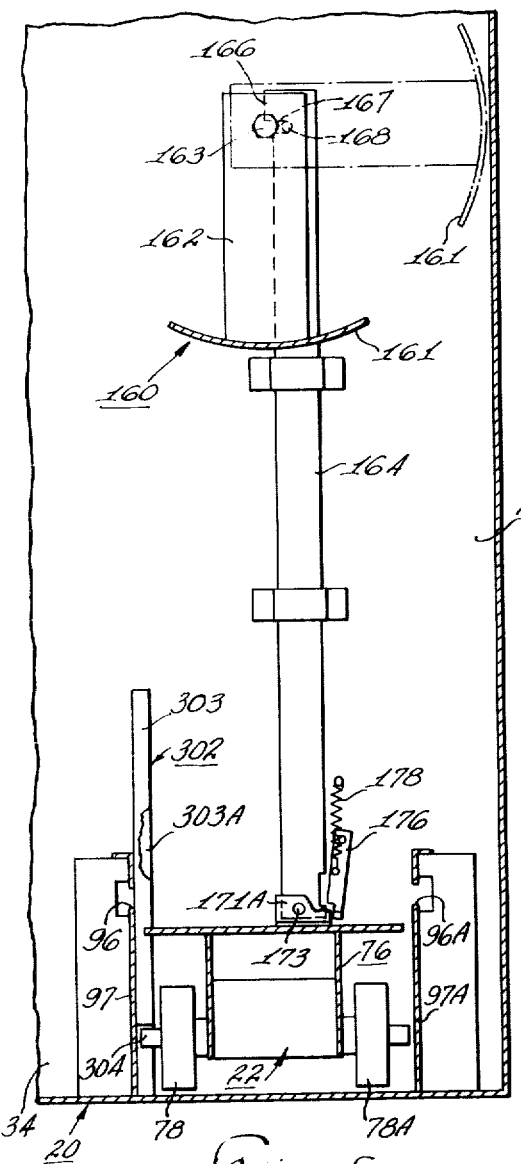
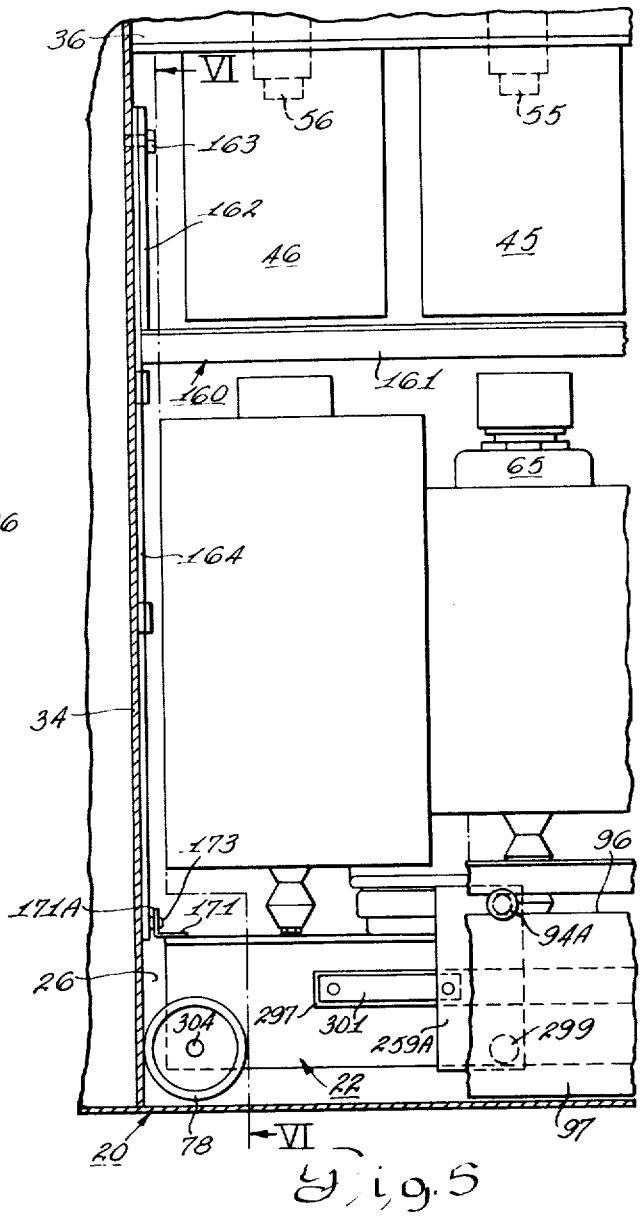
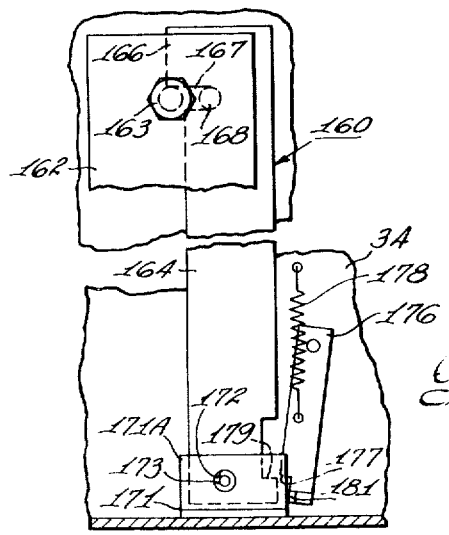

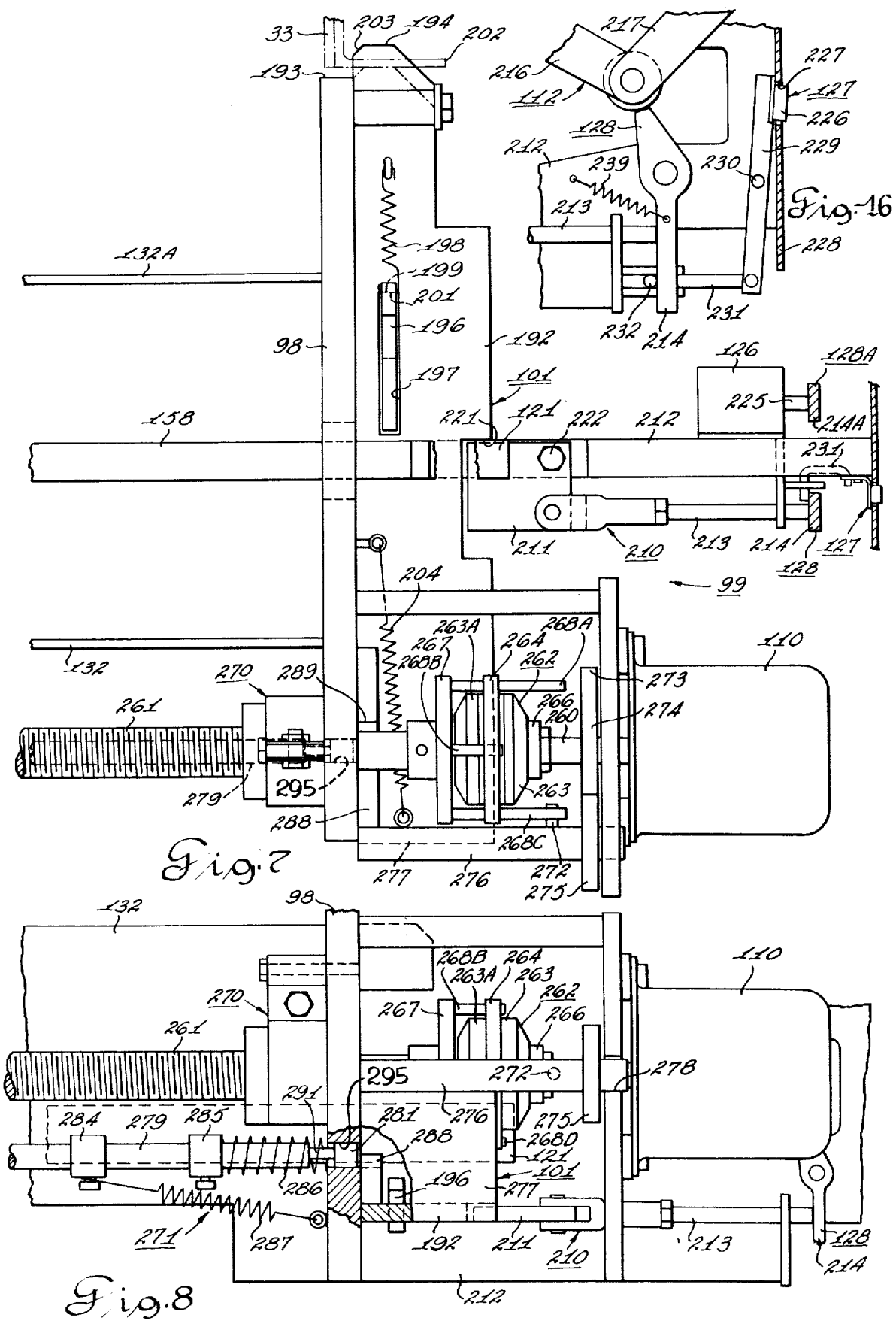

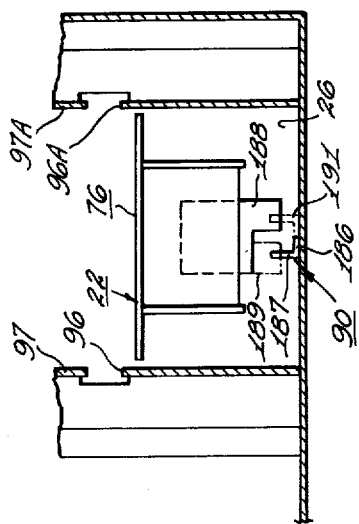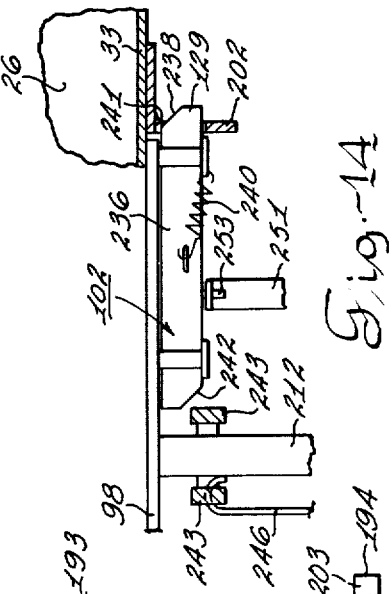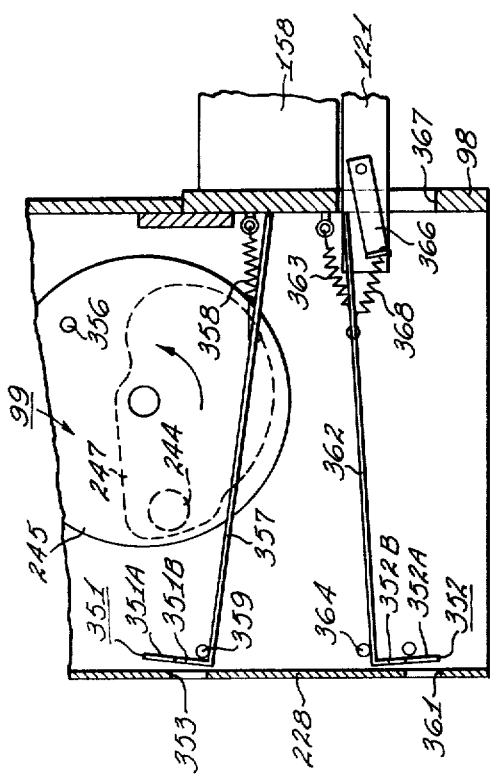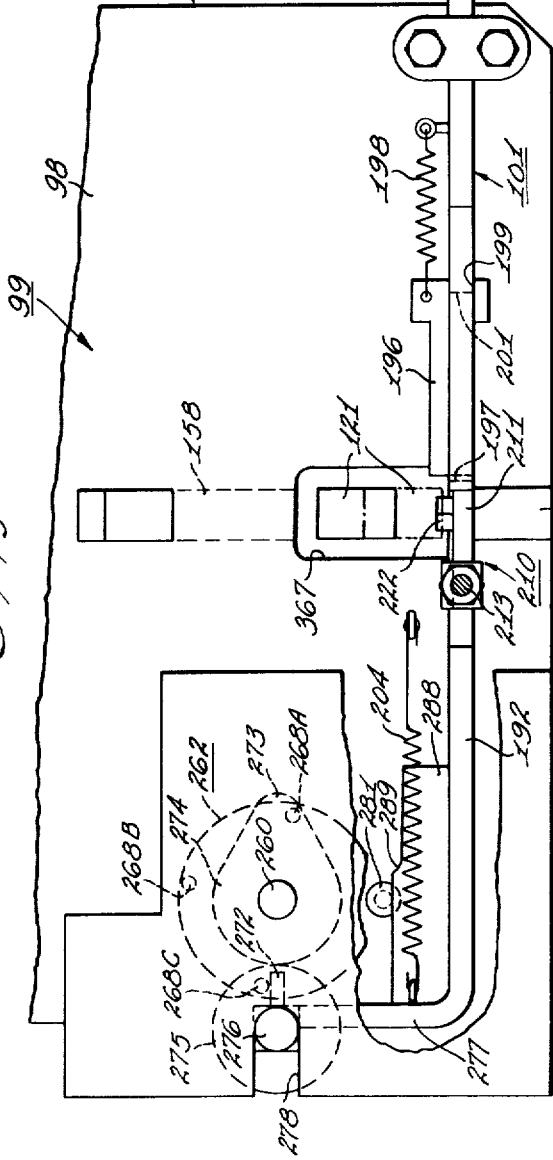

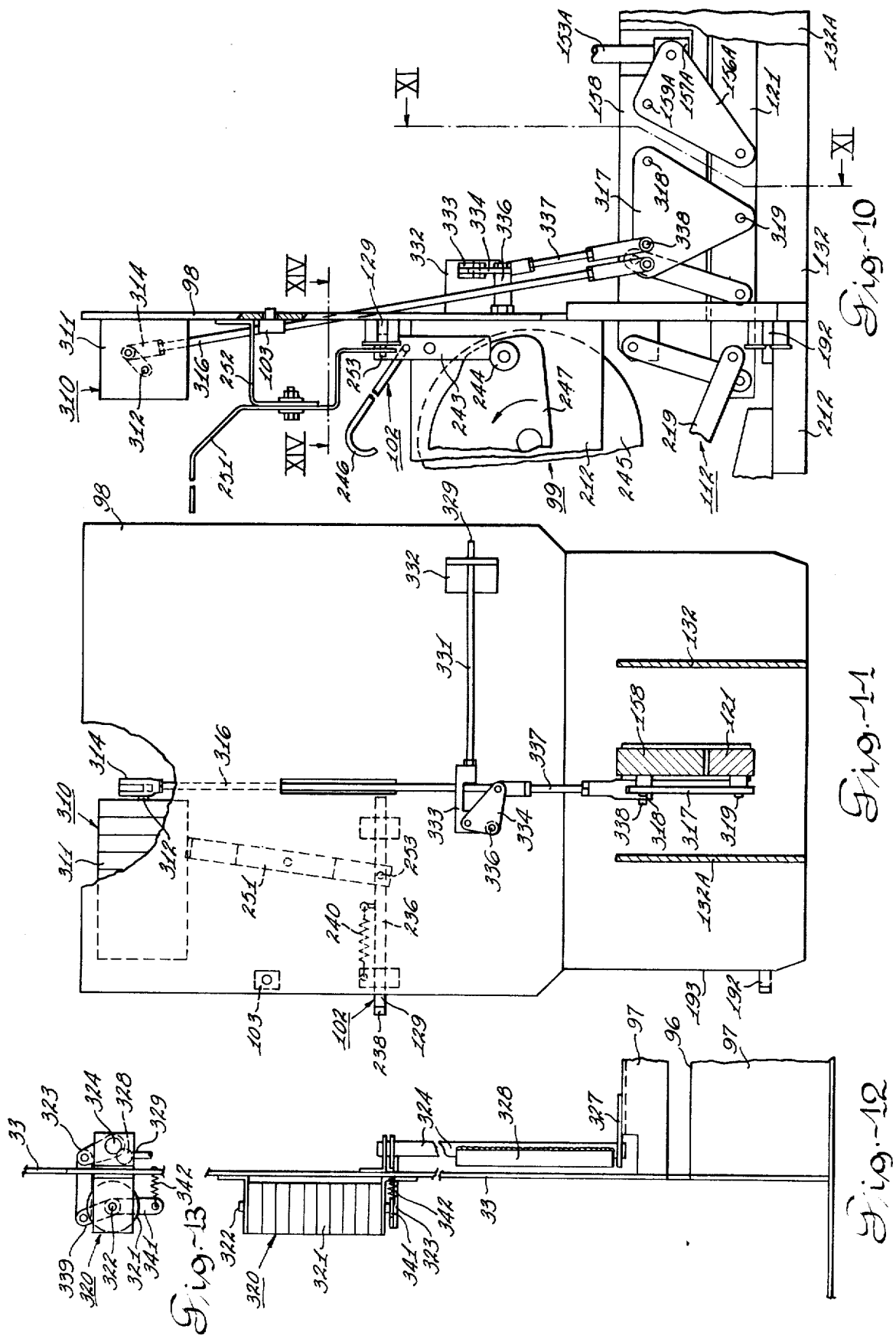

VACUUM INTERRUPTER METAL-CLAD SWITCHGEAR VERTICALLY ELEVATABLE WITHIN COMPARTMENT

BACKGROUND OF THE INVENTION

This invention relates to metal enclosed switchgear and more particularly to a vacuum circuit interrupter which is mounted on a movable truck insertable within the compartment of the switchgear equipment. Suitable interlocking means are provided for safeguarding operating personnel.

For the past years a significant growth in population of the urban areas of this country has taken place while at the same time the increased use of electrical power has compounded the problem of supplying the needs of this urban growth. Concurrent therewith, the public concern with esthetics has forced a re-evaluation of how to best serve the electrical loads of the future efficiently and at the same time satisfy the environmentalists. The basic answer in many cases has been to raise the traditional distribution voltages to a much higher level. The availability of high capacity metal-clad switchgear for 34.5 kV applications is providing a practical answer for an increasing number of utilities. This equipment must be available in compact, attractive lineups for both indoor and outdoor installations. The use of vacuum interrupters has enabled manufacturers to reduce equipment size by providing all of the well recognized advantages of metal-clad construction. In addition, high densities require that these new stations be built in already established urban neighborhoods. In some cases such substations are needed in the congested downtown districts or major cities. Here the requirements for pleasing appearance and compact size are even more extreme than in the recent past.

With the advent of full scale, high capacity substations at the higher voltage level, equipment flexibility becomes increasingly important. No longer can the concern of the manufacturer be concentrated on a simple high side transformer breaker. He must also be able to accomplish a variety of circuit configurations: the ring bus arrangement, the breaker-and-a-half scheme, as well as the more traditional double ended station with high capacity secondary main and tie breakers. Complex protective relay schemes are needed, and ways must be found to provide current transformers on both sides of the breakers to meet differential zone requirements. A variety of auxiliary equipment must also be accommodated: control power and potential transformers, arresters, and multicable terminations and bus duct connections.

The availability of vacuum switch interrupters has made it possible to utilize these devices to effect a reduction in the size of switchgear. The interruption efficiency and the compact size of the vacuum switch interrupter make it ideal for application where size is important. This has led to design of vacuum oriented metal-clad switchgear for use in distribution system applications at 34.5 kV.

SUMMARY OF THE INVENTION

It has been found in accordance with this invention that the foregoing requirements may be accomplished by providing a metal enclosed switchgear utilizing vacuum switch interrupters to obtain a compact size and maximized esthetic looks, broad performance and application capabilities, maximum serviceability coupled with low maintenance needs, and innovative use of materials. These broad parameters have been accomplished with the provision of an in-line vertical lift vacuum circuit breaker. With the need for two vacuum interrupters per phase, the in-line design makes the best possible use of space and material, as well as simplifying servicing. The vacuum circuit breaker insertable component is equipped with automatic disconnecting primary and secondary contacts, position indicator, operation counter and auxiliary switches. Interlocks on the removable circuit breaker prevent making or breaking load current on the primary disconnects. The mechanism for breaker operation is of the stored energy type, using a motor to accumulate the required closing power in heavy duty springs. Tripping springs are charged upon closing of the breaker. Bearing wheels provide easy vehicle handling into and out of the cubicle compartment. The breaker is inserted into the cubicle manually and elevated into the connected position either manually or by means of an optional motor drive if desired. When in the fully connected position, each vacuum interrupter is enclosed in its own stationary porcelain housing. The primry disconnects are located in these same housings and feed vertically, directly to the main horizontal bus, and up through a longer porcelain insulator to the outgoing compartment at the rear of the interrupter compartment. Each of the six porcelain primary disconnect insulators has provision for two toroidal current transformers mounted below the bus compartment; thus, four transformers per phase can be used, making complex bus differential protective schemes easy to accomplish. With the breaker removed, the transformers can be reached without any need to open the bus compartment or to disturb any of the high voltage circuits.

A large rear cable entrance compartment is provided with adequate space for station-type lightning arresters and potheads. Each cubicle is equipped with double hinged doors, both front and rear, to provide ready access. The front panels provide adequate space for normal relaying and instrument needs on the left-hand panel. The use of separate panels provide for access to the breaker or the rear of the relay panel without requiring opening the other panel.

An auxiliary compartment of the same size as the breaker unit is available to draw out high voltage fuses for potential or control power transformers. Various other auxiliary devices may be mounted in this unit as required by the specific application.

As previously mentioned, the in-line arrangement of the vacuum switch interrupters makes the best possible use of space and material as well as simplifying the servicing.

A general object of the invention is to provide a switchgear arrangement of compact size with maximum serviceability coupled with low maintenance requirements.

Another object of the invention is to provide an in-line vacuum switch arrangement for a circuit breaker.

Yet another object of the invention is to provide an in-line vertical lift vacuum circuit breaker.

A further object of the invention is to provide an in-line vertical lift vacuum circuit breaker wherein each vacuum interrupter is enclosed in its own stationary porcelain housing when in fully connected position.

A still further object of the invention is to provide an in-line vertical lift vacuum circuit breaker wherein each vacuum interrupter is enclosed in its own stationary porcelain housing which also houses individual associated primary disconnects.

Still another object of the invention is to provide a switchgear arrangement having facilities for feeding horizontal buses to an outgoing compartment at the rear of the circuit breaker compartment from the main horizontal buses.

A still further object of the invention is to provide novel simplified interlocks for preventing insertion or withdrawal of the vacuum circuit breaker into and out of the breaker compartment until safety requirements are established.

The foregoing and other objects of the invention will become apparent from the following description in conjucntion with the accompanying drawings in which:

DESCRIPTION OF DRAWINGS

FIG. 1 is a view in left side elevation of the metalclad switchgear enclosure with the parts broken away to show the interrupter within its compartment in disconnected position;

FIG. 2 is a view in front elevation of the metal-clad switchgear enclosure with parts broken away to show the vacuum interrupter therein in disconnected position;

FIG. 3 is a view in left side elevation of the inline vacuum interrupter mounted on the carriage, barriers being broken away to show the interrupter support and actuating arrangement;

FIG. 4 is a view in horizontal section through the interrupter arrangement of FIG. 1 taken on a plane represented by the line IV—IV in FIG. 3;

FIG. 5 is a detail fragmentary view in elevation of the front portion of the circuit breaker within the enclosure compartment showing the bus shutter plate in protecting position relative to the porcelain housings in which the primary disconnects are located;

FIG. 6 is a detail view in elevation of the shutter actuator taken in a plane represented by the line VI—VI in FIG. 5;

FIG. 7 is a fragmentary detail view of the drive mechanism for elevation of the vacuum interrupter into connected position and of the trip interlock mechanism;

FIG. 8 is a fragmentary view of left side elevation of the drive mechanism and the trip interlock mechanism;

FIG. 9 is a fragmentary detail view in front elevation of the trip interlock mechanism;

FIG. 10 is a fragmentary detail view partly in vertical section and partly in elevation through the circuit breaker showing various operating linkages for the auxiliarly switches;

FIG. 11 is an enlarged detail view of the back plate of the stored energy operator taken in a plane represented by the line XI—X in FIG. 10;

FIG. 12 is a detail view of the operating mechanism associated with the enclosure mounted auxiliary switches;

FIG. 13 is a plan view of the linkage for operating the enclosure mounted auxiliary switches of FIG. 12;

FIG. 14 is an enlarged detail view of the vacuum switch energy release interlock taken in a plane represented by the line XIV—XIV in FIG. 10;

FIG. 15 is an enlarged detail view of the rating interlocks;

FIG. 16 is an enlarged detail view of the trip arrangement for the prop lever of the trip-free linkage;

FIG. 17 is an enlarged detail view of the shutter operating mechanism of FIG. 6; and, FIG. 18 is an enlarged detail view of the coded visual indicator arrangement.

DESCRIPTION OF THE PREFERRED EMBODIMENT

In FIG. 1 of the drawings, a metal enclosed switchgear is generally indicated at 20 and comprises an enclosure 21 and a draw out type in-line vertical lift vacuum switch circuit breaker 22. The enclosure 21 comprises metal side walls and supports formed to provide a lower circuit breaker compartment 26 which is adapted to receive the removable in-line vertical lift vacuum switch circuit breaker 22. The front portion of the enclosure is provided with two center closing doors 27 and 28 which provide access into the enclosure, both for the vacuum switch circuit breaker 22 and for auxiliary equipment.

The rear of the enclosure is likewise provided with center closing double doors 29, one of which is shown, that provide access to a cable compartment 31 extending from the floor to the top of the enclosure. As previously mentioned, the enclosure is formed to provide a metal-clad compartment 26 for sufficient depth for receiving the vacuum switch circuit breaker 22, the compartment 26 being closed at the top by means of a ceiling plate 32 that extends from an internal wall 33 to the cable compartment 31 and rear wall 34.

Within the enclosure there is provided a fabricated support means 36 that is welded or otherwise secured to the inner surfaces of the front wall 33 and rear wall 34. The longitudinally extending fabricated means 36 is adapted to support a plurality of relatively long porcelain insulators 41, 42, 43, 44, 45 and 46 in which are supported primary disconnect stud contacts 51, 52, 53, 54, 55 and 56. Each primary disconnect stud contact extends vertically through the porcelain insulators and is electrically connected to a horizontal bus which may either by incoming or outgoing as the situation warrants. Thus, the buses 51A, 53A and 55A may be used as load lines while the buses 52A, 54A and 56A may be utilized as incoming lines or vice versa. With the vacuum switch circuit breaker 22 located in operative position within the compartment 26, each of the vacuum switches 61, 62, 63, 64, 65, and 66 are disposed in axial alignment below related disconnect stud contacts 51 though 56 which are enclosed in the associated depending porcelain insulator 41 through 46. Elevation of the entire vacuum switch circuit interrupter 22 is accomplished to effect the connection of the vacuum switches with the bus terminals. Side plates or walls enclose the cubicle to make it inaccessible except through the front or rear doors.

As mentioned, the porcelain insulators 41 through 46 are carried by the fabricated support 36 and extend upwardly. As shown, the porcelain insulators 41, 43 and 45 terminate in open cubicles 71, 71A and 71B which are formed by steel vertical transverse barriers located directly above the circuit breaker compartment 26. The primary disconnect studs 51, 53 and 55 are electrically connected to associated horizontal transversely extending main buses. On the other hand, the procelain insulators 42, 44 and 46 extend upwardly and terminate within an enclosed horizontal bus compartment 73. Within the compartment 73 the load primary disconnect studs are electrically connected with associated load buses 52A, 54A and 56A which extend into the vertical bus compartment 31 at the rear of the enclosure. Each of the six porcelain primary disconnect insulator 41–46 has provision for two toroidal current transformers 41A–41B through 46A–46B that are mounted below the bus compartments 71. Thus, four transformers per phase can be used, making complex bus differential protective arrangements easy to accomplish. With the circuit breaker unit removed, the transformers can be reached without any need to open the bus compartment or to disturb any of the high voltage circuits.

The in-line vertical lift vacuum circuit breaker 22 is on a carriage 76 for insertion into the compartment 26 of the enclosure 21. To this end the carriage 76 is an elongated fabricated frame 77 having a pair of spaced apart forward wheels 78 and a pair of spaced apart balance wheels 79, which serve as a pivot point about which the carriage 76 is steerably pivotal. At the extreme right end of the carriage 76, as viewed in FIGS. 1 and 3, there is provided a pair of spaced apart swivel wheels 81 and 81A which serve to maintain the right end of the carriage 22 from bottoming on the floor whenever the operator exerts a downwardly acting force to the carriage guide handle 82. Normally the carriage rolls on the forward pair of wheels 78 and the intermediate balance wheels 79. When it is necessary to change the direction of travel of the carriage 76 and circuit breaker 22, for example, as guiding the carriage and circuit breaker unit 22 into the enclosure compartment 26, all that is necessary is that the operator exert a relatively light downwardly acting force to the handle 82. When a downwardly acting force is applied to handle 82, practically the entire weight of the carriage and components will be borne on the intermediate balance wheels 79–79A, thereby making it extremely easy for the operator to steer the carriage.

Guide means 86 initially guide the circuit breaker 22 into the compartment 26 to ensure that inadvertent damage to a polyester barrier 87 and/or the vacuum envelopes does not occur. A breaker rating interlock means 90, see FIG. 15, is provided so that correct mating of a rated circuit breaker 22 with the proper rated enclosure is always insured.

As the circuit breaker 22 is moved inwardly into the compartment 26 past the rating interlock means 90, rollers 94 associated with a circuit breaker racking means 95 are picked up by trackways 96 and 96A on each side of the compartment 26. As the circuit breaker 22 continues inwardly, a contact trip interlock 101 checks whether the circuit breaker 22 is in open or closed condition. If the circuit breaker 22 is in a closed condition, the trip interlock 101 prevents the circuit breaker from being completely inserted into the compartment 26 until the breaker has been opened. If the breaker is in open condition or the operator has tripped the breaker, the breaker 22 can be moved further into the compartment 26. A closing spring interlock 102 operates to latch the breaker into its disconnect position within the compartment 26 and the interlock 102 must also be operated before the circuit breaker can be fully entered and latched within the compartment 26 in disconnected position. The closing spring interlock 102 operates to automatically effect a discharge of the closing springs in the breaker operator 99.

Once the back plate 98 of the operator 99 is adjacent the barrier wall 33, an actuator of a switch 103 carried on the backplate 98 engages the barrier wall 33 to actuate the switch. The circuit breaker 22 can now be either tested in the lower disconnected position or be racked up into connected position.

Testing of the circuit breaker 22 is accomplished by actuating a lever 106 at the left side of the circuit breaker 22 but the lever 106 is actually carried by the enclosure 21. Actuation of the lever 106 will engage contacts on a pivot block 306 with contacts on a panel 305 of a secondary disconnect assembly 107 and the circuit breaker can be electrically operated. After testing has been satisfactorily accomplished the lever 106 is returned to its original position to disengage the pivot contacts block 306 from the contacts of the secondary circuit disconnect assembly panel 305 and the circuit breaker 22 can be racked up into elevated connected position.

Racking of the circuit breaker 22 into an elevated connected position can be accomplished by energizing a motor 110 or can be done manually by means of a crank (not shown) in lieu of the motor 110. Energization of the motor 110 will first accomplish the displacement of the contact trip interlock means 101 so that a trip-free linkage 112 is in collapsed position. After the interlock means 101 has been actuated, further operation of the motor 110 will activate the circuit breaker racking or elevating means 95. Elevation of the circuit breaker 22 will connect the vacuum switch primary disconnect fingers 61A through 66A through 66A with the respective primary terminals 51 through 56 within the vertically disposed porcelain insulators 41 through 46, respectively.

The movable contacts of the vacuum switches 61 through 66 of the circuit breaker 22 require a one-half inch of travel. Thus, the closing springs 114 and 114A are of a size to store sufficient energy to charge an opening spring 118 and also to lift the weight of the components which are connected to a longitudinally extending switch actuating drive bar 121, FIGS. 3, 4 and 10. In addition, the closing springs 114 and 114A, after contact engagement has been effected, must compress the contact pressure springs 122A, 122B, 122C, 122D, 122E and 122F that are located directly beneath associated bottles. At this point, the contact pressure springs are preloaded to a desired degree.

If the circuit breaker 22 is tripped either by operation of a solenoid 126 or manually by actuating a release button 127, FIGS. 7 and 16, accessible at the front of the circuit breaker, or by operating the contact interlock 101, a prop or trip lever 128 associated with the operator 99 releases a trip-free linkage 112 thereby permitting the switch actuating drive bar 121 to move leftwardly and upwardly, as viewed in FIG. 10, towards the operator 99. As the drive bar 121 moves upwardly, the vacuum switch contacts are separated. Since the contact pressure springs 122 associated with the individual vacuum switches 61 through 66 were preloaded, they give the contacts an initial velocity and also aid in breaking any weld that may have occurred between the contacts of the individual vacuum switches at the time of closing.

To remove the circuit breaker 22 from the compartment, the racking motor 110 is energized to operate in the opposite direction to effect the lowering of the circuit breaker to a disengaged position. However, if the contacts of the vacuum switches have not been opened, the operator must open the contacts of the vacuum switches so that there is no separation between the primary disconnects until the primary circuit is de-energized. With the vacuum switches in open position, the motor acting on the racking means effects a lowering of the circuit breaker. When the circuit breaker is in its lowered position the contact interlock 101 snaps "in" to signal that the circuit breaker 22 is in disconnect position. To remove the circuit, the closing spring interlock 102 is operated to release the latch 129 and also to release any energy stored in the operator closing springs 114 and 114A.

The in-line vacuum switch circuit breaker 22 includes the carriage 76 comprising the frame 77 which is constructed of spaced apart plates 132 and 132A reinforced by transverse plates 133. The carriage 76 supports six vacuum switches 61 through 66, two per phase. To this end there is provided a plurality of insulator supports 136 and 137, one for each phase. The insulator supports 136 and 137 as shown in FIG. 3 are mounted on cross plates 139 and 141 which are secured to the longitudinally extending frame plates 132 and 132A. The insulator 138 is carried on the rearward portion of the guide plate 86. Each insulator support is provided with a switch mounting bar 142, 143 and 144, respectively. As shown in FIG. 3, the vacuum switches 61 and 62 are carried on the bar 142 with the movable contacts 146 and 147 thereof extending downwardly therethrough. The sets of contact pressure springs 122A and 122B are captive between upper and lower plates 148 and 149. The proper amount of compression on the contact pressure springs is established by adjustable nuts 151 threadedly engaged on the lower ends of screws 152 that extend through the springs. Identical structure is provided for the vacuum interrupters 63, 64, 65 and 66, as shown.

The lower ends of the movable switch contacts 146, 147 are each coupled to insulating connecting rods 153A and 153B, respectively. As exemplified by the insulator connecting rods 153C and 153D associated with the middle phase arrangement, the lower ends of the insulator connecting rods 153C and 153D are pivotally connected to the bell cranks 156C and 156D by means of pivot blocks 157C and 157D which recess within suitable openings formed in the backbone bar 158. The bell cranks 156C and 156D, in turn, are pivotally connected to the backbone bar 158 as at 159C and 159D. The opposite corners of the bell cranks 156C and 156D are pivotally connected as at 161C and 161D to the longitudinally extending drive bar 121 which is disposed directly below the backbone bar 158.

Thus, longitudinal movement of the drive bar 121 to the left, as viewed in FIG. 3, or to the right, as viewed in FIG. 10, will operate the bell cranks 156C and 156D to effect upward movement of the insulator rods 153C and 153D to move the contacts 146A and 147A to closed positions. It will be understood that an identical arrangement is provided for the other vacuum switches so that all the switches are closed or open simultaneously through the operator 99 via the drive bar 121.

To prevent possible accidential contact with the terminal ends 51 through 56 either when the circuit breaker 22 is in disconnected position within the compartment 26 or when it has been removed, a shutter mechanism 160 is provided. As best shown in FIGS. 1, 5, 6 and 17, the shutter mechanism 160 includes an elongated shutter 161 that is supported for pivotal movement by a pair of end arms 162 and 162A. The free ends of the arms 162 and 162A are pivotally supported on associated studs 163 and 163A which are secure in adjacent end walls 34 and 33, respectively.

The shutter 161 is normally disposed in a blocking position between the primary disconnects of the circuit breaker 22 and the lower open ends of the porcelain insulators 41 through 46, respectively. In this position it is reasonably sure that personnel will not make contact with the bus terminals or even that a tool could be inadvertently inserted into the porcelain insulators. When the circuit breaker is racked into connect position, the shutter 161 is automatically pivoted from its normal position indicated in full lines in FIGS. 1, 2, 5 and 6 to a raised position as indicated by the broken line showing of the shutter in FIG. 6. To this end, an actuating lever 164 is supported for vertical movement on the rear wall 34 of the compartment 26. The upper end of the lever 164 is formed with a horizontal leftwardly extending leg portion 166 in which a horizontal slot 167 is formed. The slot 167 is adapted to cooperate with a rearwardly extending drive stud 168 secured in the shutter arm 162 in a position adjacent the pivot stud 163. Thus, as the lever 164 is moved upwardly the drive stud 168 within the slot 167 is forced to move in an arcuate path of travel about the pivot stud 163. This arcuate travel of the drive stud 168 forces the shutter arm 162 to move in an arcuate path of travel about the pivot stud 163 thereby moving the shutter 161 from the protecting or closed position that it occupies, as depicted in full lines in FIG. 6, to an open position depicted in broken lines in FIG. 6.

Operation of the lever 164 both in an upward shutter opening movement and in a downward shutter closing movement is effected automatically with the racking up or racking down of the circuit breaker 22. To this end, the forward end of the circuit breaker 22 is provided with an angle bracket 171 having an upstanding leg 171A, as best shown in FIGS. 5, 6 and 17. The leg 171A is provided with an opening 172 that is adapted to receive a stud 173 carried by the lower end of the lever 164. A locking latch 176 having a relieved portion which forms a shoulder 177 is pivotally supported on the wall 34 adjacent to the lever 164. The latch 176 is biased into latching position by operation of a spring 178 which normally urges the lower end of the latch leftwardly, as viewed in FIGS. 6 and 17, so that the shoulder 177 of the latch engages a complementary shoulder 179 formed in the lever 164. Thus, as the circuit breaker 22 is moved fully into the compartment 26 the leg portion 171A of the bracket 171 engages a beveled projection 181 on the latch 176 thereby camming the latch 176 rightwardly to disengaged position. Slightly before the displacement of the latch 176 occurs, the opening 172 in the bracket leg 171A engages on the stud 173. Thus, as the circuit breaker 22 is racked up into connected position, the lever 164 will move upwardly with the circuit breaker to move the shutter 161 to open position.

As previously mentioned, the circuit breaker 22 as it is inserted into the compartment 26 will partially enter into the compartment where a rating interlock 90, FIG. 15, checks the rating of the circuit breaker 22 against the rating of the enclosure. If the ratings are not compatible, the circuit breaker cannot be entered into the compartment 26.

To this end the floor of the compartment 26 is provided with a bracket 186 having an upstanding leg 187, which, for purposes of this description, is assumed to identify an enclosure rated for a 1200 amp breaker. A 1200 amp breaker will be provied with a depending stop bracket 188 which allows the circuit breaker 22 to be inserted into the compartment 26. However, if the circuit breaker 22 was of a different rating from the rating of the enclosure, for example 3000 amps, the circuit breaker would be provided with a depending bracket 189, shown in broken lines in FIG. 15. If this was the case, the 3000 amp bracket would engage the upstanding leg 187 of the enclosure 1200 amp bracket and effectively prevent full entry of the circuit breaker into the compartment 26. Should the enclosure have a 3000 amp rating, it will be provided with a 3000 amp bracket 191 which would be located in the path of travel of the 1200 amp circuit breaker bracket 188 to thereby prevent entry of a 1200 amp circuit breaker into a 3000 amp enclosure.

As the circuit breaker 22 is pushed into the compartment 26, the contact interlock 101 checks whether the contacts of the vacuum switches 61 through 66 are in open or closed position; and if in closed position, prevents the full entry of the circuit breaker 22 into the compartment 26. To this end, the interlock 101 includes a horizontally disposed movable bar 192, the end 194 of which extends beyond the right side 193 of the lower portion of the backplate 98, as shown in FIG. 9. A stop 196 is disposed to move vertically in a slot 197 but is maintained in a horizontal plane by operation of a spring 198. The right end, FIG. 9, of the stop 196 is formed with a notch 199 which engages on the right-hand edge 201 of the slot 197. Thus, by pressing downwardly on the left end of the stop 196, the action of the spring 198 can be defeated to depress the stop below the top surface of the bar. However, in normal operation the stop 196 is maintained in the horizontal position, as shown in FIG. 9. In order to insert the circuit breaker 22 fully into the compartment 26, the interlock bar 192 must be displaced to the left, as viewed in FIG. 9, or downwardly, as viewed in FIG. 7, to clear the end 194 from engagement with the structural post 202 of the enclosure. This can be accomplished only if all of the contacts of the vacuum switches are in open position. This is true because if the vacuum switches are closed, the drive bar 121 will have been moved leftwardly, as viewed in FIG. 3, and in such movement will also have been moved downwardly because of the action of the bell cranks 156 associated with all of the vacuum switch contacts. Thus, the end of the drive bar 121 which extends through a suitable opening in the backplate 98 of the operator 99 will be in the lower position, as depicted by the broken line showing of the bar 121 in FIG. 9. In its lower position the drive bar 121 is effectively in the path of travel of the stop 196. Thus, the interlock bar 192 cannot be made to move sufficiently far enough to clear the end 194 thereof from engagement with structural member 202 of the enclosure because the stop 196 will engage the side of the drive bar 121.

However, if the vacuum switch contacts are in open position, the drive bar 121 will be in an elevated position that it occupies, as depicted in full lines in FIG. 9. A bevel surface 203 on the end 194 of the interlock bar 192 will effect movement of the interlock bar 192 to the left, as viewed in FIG. 9, as the circuit breaker 22 is urged into the compartment 26, so as to permit full entry of the circuit breaker 22 into the compartment. A return spring 204 biases the bar 192 to its normal extended position.

To maintain the circuit breaker operating mechanism trip-free, a trip means 210 is provided to be operated by the bar 192. The trip means includes a pivot plate 211 that is supported for pivotal movement in a horizontal plane on a vertical center plate 212 of the stored energy operator 99. A rod 213 is connected to the pivot plate 211 and extends rearwardly to a point short of the lower end 214 of one of a pair of trip levers 128 and 128A, the trip levers 128 and 128A being coupled together to move as a unit. The trip levers are operable to support a prop link 216 that is connected to a control link 217 of a trip-free linkage arrangement 112, well known in the art, which is normally operable through an end link 219, shown in FIG. 10, which is connected to the drive bar 121 to maintain the contacts of the vacuum closed. However, when the trip latches 128–128A are displaced in a counterclockwise direction, as viewed in FIG. 16, the trip-free linkage 112 collapses and the contacts of the vacuum switches will open. Thus, as viewed in FIG. 7, as the bar 192 is moved downwardly a shoulder 221 formed on the bar 192 engages the side surface of the pivot plate 211 forcing the plate to pivot about the pivot screw 222 in a counterclockwise direction. As a result, the rod 213 is moved into engagement with the lower end 214 of the trip lever 128 thereby releasing the prop link 216 so that the trip-free linkage 112 collapses. This releases the opening spring 118 to move the contact drive bar 121 to open the contacts of the vacuum switches. The pivot plate 211 is reset, upon the return of the bar 192 to its normal position, by operation of spring 239, FIG. 16, which operates to bias the prop lever 128 in a clockwise direction. Thus, with the interlock bar 192 biased to its normal position, as depicted in FIG. 7, the plate 211 is released and the end 214 of the prop lever 128 will force the rod leftwardly to reset position.

The solenoid 126 is also provided to actuate the trip lever 128A. As shown in FIG. 7, the solenoid 126 is secured to the center plate 212 on the side thereof opposite the rod 213. Upon energization of the solenoid 126, from a signal source not shown, an associated plunger 225 is moved into forceful engagement with the end 214A of the trip latch 128A. This will collapse the trip-free linkage 112 to open the vacuum switch contacts.

The release button 226 of the manual trip 127 is accessible through a suitable opening 227 provided in a cover 228 that is arranged to encase the stored energy operator 99, as shown in FIG. 6. The button 226 is attached to the end of a lever 229 which is pivoted about a pin 230 that is mounted in the center plate 212. The lower end of the lever 229 is pivotally connected to a rod 231 which extends between the ends 214 and 214A of the trip lever 128–128A. A cross bar 232 secured to the inner end of the rod 231 couples the rod to the prop latches. Thus, upon pressing the trip button 226 the rod 231 will be pulled rightwardly, as viewed in FIG. 16, so that the bar 232 will force the trip latches 128–128A in a counterclockwise direction to release the trip-free linkage 112.

As previously mentioned, with the circuit breaker 22 tripped, the circuit breaker 22 can be fully entered into the compartment 26. Upon this occurrence the closing spring interlock 102 will latch the circuit breaker 22 in the compartment 26. As can be seen in FIG. 14, the interlock 102 includes a bar 236 which is slidably supported on the backwall 98 of the stored energy operator 99 on the same side as the interlock bar 192. The extending latch portion 129 of the bar 236 is provided with a cam surface 238 that is adapted to engage a surface in the post 202 for camming the bar 236 leftwardly, as viewed in FIG. 14. With the circuit breaker 22 fully entered into the compartment 26, a spring 240 biases the bar 236 rightwardly. Rightward movement of the bar 236 moves the latch end 129 of the bar into a suitable opening 241 provided in the post 202 to latch the circuit breaker in the compartment 26.

As the bar 236 is forced leftwardly to permit full entry of the circuit breaker 22 into the compartment 26, a cam surface 242 on the left end of the bar 236 engages the upper end of a closing latch 243, shown in FIGS. 10 and 14. The latch 243 is normally biased into the position depicted wherein it engages an abutment 244 carried by a trip-free linkage actuating cam 247 that is rotatable with a closing spring charging wheel 245. Thus, when the bar 236 is moved leftwardly, as viewed in FIG. 14, the closing latch 243 will be pivoted in a counterclockwise direction, FIG. 10, thereby moving the lower end of the closing latch out of engagement with the abutment 244. This releases the closing spring charging wheel 245 to release any stored energy that may be available in the operator 99. Thus, it is apparent that the two interlocks 101 and 102 insure that the vacuum switch contacts are open and that any stored energy in the operator 99 is dissipated before the circuit breaker can be fully entered into the compartment 26.

The closing latch 243 can be moved to disengaged position manually if so desired. To this end a lever 246 is provided which is connected to the latch 243 above its pivot axis. Thus, a light upward pull on the lever will cause the closing latch 243 to be moved out of stop engagement with the abutment 244 thereby releasing the closing spring charging wheel 245 to relieve any stored energy in the springs 114 and 114A.

When it is desired to remove the circuit breaker 22 from compartment 26 the interlock 102 must be actuated manually to unlatch the circuit breaker and to discharge any stored energy that may be in the operator 99. To this end a lever 251, FIGS. 10, 11 and 14, is provided within easy access to the maintenance personnel. The lever 251 is pivotally supported on a bracket 252 which extends outwardly from the backplate 98 of the operator 99. At its lower end the lever 251 has a pivotal connection as at 253 with the bar 236. By moving the upper portion of lever 251 to the left, as viewed in FIG. 11, the bar 236 will be disengaged from the opening 241 in the post 202, FIG. 14, and simultaneously therewith the trip lever 243 will be actuated. Thus, any stored energy in the operator 99 will be released and the circuit breaker unlatched for removal.

To connect the circuit breaker 22 to the bus terminals, it must be racked up to an elevated position. To this end, as the circuit breaker 22 was entered into the compartment 26 the guide rollers 94A, 94B, 94C and 94D carried by racking arms 259A, 259B, 259C and 259D, respectively, enter into the longitudinally extending trackways 96 and 96A on each side of the compartment 26, as best shown in FIG. 2. The racking arms 259A through 259D are actuated by a shaft 260 and can be rotated either by power through the motor 110, as shown in FIGS. 7 and 8, or manually by removing the motor 110 and inserting a crank (not shown) into the shaft 260 to elevate the circuit breaker. To this purpose, the shaft 260 is connected to drive a screw 261 through a friction clutch 262. The clutch can be of any of the well known torque limiting types and essentially comprises a pair of driving members 263 and 263A which are keyed to rotate with the input shaft 260. The driving members have frictional engagement with a torque transfer plate 264 which is freely rotatable and mounted on the input shaft 260. A pressure adjusting collar 266 controls the amount of frictional engagement that the driving members 263 and 263A have with the torque transfer plate 264.

Mounted on and secured to a reduced portion of the screw 261 is a clutch collar 267 having four longitudinally extending pins 268 which are shown in FIG. 7. The pins 268 are spaced 90° apart and engage in suitable openings in the torque transfer plate 264 of the friction clutch 262. Thus, as the plate 264 is driven by the drive members 263 and 263A, the torque is transmitted via the pins 268 to the clutch collar 267 and thence to the ball screw 261. Because of the high efficiency of the ball screw, the weight of the circuit breaker 22, when the motor 110 is de-energized, could conceivably force the ball screw 261 to rotate in the opposite direction to thereby inadvertently disconnect the circuit breaker resulting in damage to the equipment. To insure against inadvertent rotation of the screw, a one-way clutch and brake means 270 is provided. When the screw 261 is rotated in a direction to elevate the circuit breaker 22 into connected position, the brake 270 has no effect on the screw 261. However, rotation of the screw 261 in the opposite or lowering direction of rotation is resisted by the brake 270 so that the weight of the circuit breaker 22 by itself cannot rotatably drive the ball screw.

As previously mentioned, it is essential that the contacts of the vacuum switches be open before the circuit breaker 22 can be racked up into connected position. This condition is checked automatically when the circuit breaker 22 is initially moved upwardly into connected position. To this end, as shown in FIGS. 3, 7, 8 and 9, an interlock 271 which acts upon the interlock 101 is provided. As the motor 110 operates to effect operation of the clutch 262 for elevating the circuit breaker, the torque transfer plate 264 rotates the clutch collar 267 in a clockwise direction as viewed from the righthand side of FIG. 7. Upon clockwise rotation of the clutch collar 267, the long drive pin 268A moves about the axis of the shaft 260 into abutting engagement with an inwardly extending stop pin 272. At this point a cam lobe 273 of a cam member 274, which rotates with the input shaft 260, engages a displacement collar 275. Both the stop pin 272 and the displacement collar are carried by a bar 276 that is welded to upwardly extending arm 277 of the interlock bar 192. The extending end of the bar 276 is supported on the lower surface of a slot 278 formed in the motor support plate. As the cam lobe 273 engages the displacement collar 275, the interlock bar 192 is forced leftwardly, as viewed in FIG. 9. This leftward movement of the interlock bar 192, as previously described, effects the axial movement of the rod 213 into tripping engagement with the trip lever 128 to trip the trip-free linkage 112 which insures that the vacuum switch contacts are in the open position. To insure that the interlock bar 192 is held in an extended leftward position wherein the trip lever 128 is held in tripped position, an interlock rod 279 is moved rightwardly, as viewed in FIGS. 3 and 8, to engage and hold the interlock bar 192 outwardly to maintain the trip-free linkage 112 collapsed, thereby insuring that the vacuum switches are open and remain open until the circuit breaker is in connected position. To this purpose the right end 281, FIG. 8, of the interlock bar 279 is supported in a suitable opening 295 formed in the back plate 98 of the operator 99. The left end of the bar 279, as viewed in FIG. 3, having a collar 283 thereon, is mounted in a dog 282 that depends from a tubular racking bar 297. Towards the right end of the interlock rod 279 there are two adjustable collars 284 and 285. Mounted on the rod 279 and disposed between the collar 285 and the back plate 98 is a compression spring 286 which normally operates to bias the rod 279 leftwardly, as viewed in FIGS. 3 and 8. A tension spring 287 is connected to the collar 284 and the back plate 98 and normally operates to exert a rightwardly acting force on the rod 279. The springs 286 and 287 are balanced in a manner that when the dog 282 moves rightwardly with the tubular racking bar 297, the rod 279 will also move rightwardly under the influence of the tension spring 287. Thus, the motor 110 initially rotates the ball screw 261 in a direction to elevate the circuit breaker, and the interlock bar 192 is cammed outwardly or leftwardly, as viewed from the right of FIG. 7. With the interlock bar 192 cammed outwardly, a vertical side plate 288 secured to the top surface of the interlock bar 192 adjacent to the back plate 98 moves with the bar and uncovers the opening 295 in which the end 281 of the interlock rod 279 is disposed. The interlock bar 279, under the influence of the tension spring 287, will move rightwardly, as viewed in FIG. 8 or outwardly as viewed in FIG. 9. The extending end 281 of the rod 279 will engage with a shoulder 289 formed on the vertical side plate 288. This will effectively maintain the interlock bar 192 in outwardly extended position thereby maintaining the trip-free linkage 128 collapsed and the vacuum switches in open position.

As previously mentioned the springs 286 and 287 are balanced. This balance of the springs is such that the force of the tension spring 287 is only sufficient to effect rightward movement of the rod 279 a distance to extend the end 281 of the rod in the path of the shoulder 289. As this condition obtains, the compression spring 286 exerts a counteracting force on the collar 285 to balance the force exerted by the tension spring 287 thereby preventing further rightward extension of the interlock rod 279.

As the ball screw 261 continues to be rotated to elevate the circuit breaker, the dog 282 moving with the tubular racking bar 297 moves towards the collar 284 on the interlock rod 279. Upon the continued rotation of the ball screw 261, the dog 282 engages the collar 284 thereby unbalancing the force components of the springs 286 and 287 forcing the interlock rod 279 rightwardly, as viewed in FIGS. 3 and 8. The interlock rod 279 continues to be moved rightwardly until the circuit breaker 22 is in fully connected position. At this time the interlock rod 279 will have been moved to the right a distance sufficient to position an annular groove 291, FIG. 8, in a vertical plane of alignment with the vertical side plate 288 of the interlock bar 192. As this condition is obtained, the interlock bar 192 under the influence of its associated return spring 204 moves to the position depicted in FIG. 7, wherein the trip latch 128 associated with the trip-free linkage 112 is released to return to prop position.

When the ball screw 261 is driven in the opposite direction to lower the circuit breaker to disconnect position, similar procedure obtains. That is the interlock bar 192 is cammed leftwardly by the cam 274 to effect a tripping of the prop latch 128 to insure that the vacuum switches are open before the circuit breaker is disconnected. The camming action on the interlock bar 192 continues until such time as the dog 282 has been backed away from the collar 284 to permit the balancing forces of the springs 286 and 287 to equalize. When the spring forces become balanced, the interlock rod 279 will have been retracted to a position wherein the end 281 engages with the shoulder 289 of the vertical plate 288 to thereby hold the interlock bar 192 in an outwardly extended position. This position of the interlock bar 192, as previously mentioned, maintains the trip rod 213 in engagement with the end of the trip latch 214, holding the trip latch in release position so that the trip-free linkage 112 remains collapsed and the vacuum switch contacts are opened and retained open. When the circuit breaker 22 has been completely lowered to full disconnect position, the dog 282 will have been moved into engagement with the collar 283 on the end of the interlock rod 279 leftwardly, as viewed in FIG. 3. This action pulls the end 281 of the interlock rod 279 out of engagement with the shoulder 289 to the position it occupies as depicted in FIG. 8. This releases the interlock bar 192, and it is returned by the force of the spring 204 to the position depicted in FIG. 7. The trip rod 213 is retracted and the prop latch 128 is reset by action of the spring 212.

Thus, as the clutch 262 is operated to drive the screw 261 in a direction for effecting the elevation of the circuit breaker 22, a recirculating ball nut 296 mounted on the screw 261 travels rightwardly, as viewed in FIG. 3, relative to the screw 261. The nut 296 is secured to a tubular racking bar 297 so that the racking bar 297 moves with the nut 296. This rightward movement of the tubular racking bar 297 will effect vertical movement of the circuit breaker 22. To this end as shown in FIGS. 3 and 4, the racking arms 259A, 259B, 259C and 259D are secured as by being welded to transverse shafts 299 and 299A, respectively. Actuating arms 301 and 301A are pivotally secured to the tubular racking bar 297 and also to the racking arms 259A and 259D, respectively. Thus, as the tubular racking bar 297 moves in a rightwardly direction with the nut 296, the arms 301 and 301A move with it in the same direction. As the arms 301 and 301A move rightwardly, FIGS. 3 and 4, the arms 259A and 259D are forced to pivot in a clockwise direction about the axes of the shafts 299 and 299A, respectively. Since the racking arms 259A and 259D, respectively, are welded to the shafts 299 and 299A, the shafts rotate about their own axes. This rotation of the shafts 299 and 299A causes the racking arms 259B and 259C associated with the rollers 94B and 94C to rotate with the shafts. Thus, the rollers 94A, 94B, 94C and 94D confined within the trackways 96A and 96B, respectively, will cause the entire circuit breaker 22 to elevate into a connected position.

To prevent the circuit breaker 22 from moving out of the compartment 26 as it is being elevated, there is provided a locking means 302. As shown in FIG. 6, the locking means comprises a pair of spaced apart vertical bar members 303 and 303A which are welded or otherwise secured to the side plates 97 and 97A. The spacing between the bar members 303 and 303A is substantially the dimension of the axle 304 of the carriage 76. As shown in FIG. 6, the forward vertical bar member 303 extends upwardly from a horizontal plane which is slightly above a horizontal plane that is tangent to the top of the carriage axle 304. Thus, as the circuit breaker 22 is completely entered into the compartment 26, the axle 304 is free to pass under the bar member 303. As the circuit breaker 22 is racked up into elevated connected position the extending end of the axle will be captured between the two spaced apart vertical bar members 303 and 303A. This effectively prevents the circuit breaker 22 from moving longitudinally as it is being elevated.

As previously mentioned there are provisions for connecting the secondary circuit 107 both when the circuit breaker 22 is in a lower disconnect position and also when the circuit breaker is in the elevated connected position. As shown in FIG. 2, secondary circuit contacts are carried on a panel 305 which is mounted on the circuit breaker 22. In the lower disconnected position of the circuit breaker the contacts of the panel 305 are engageable by complementary contacts which are mounted on a pivot block 306. A handle 106 is operable to pivot the pivot contact block 306 into engagement with the contact panel 305 on the circuit breaker so that testing of the circuit breaker 22 in its lower disconnect position can be accomplished.

In an elevated connect position the contacts on the panel 305 engage with contacts carried by another panel 308 which is mounted within the compartment 26. Thus, as soon as the circuit breaker 22 is in connected position the secondary control circuit is energized and the stored energy operator motor 309 will energize to automatically charge the closing springs. Other functional circuits are also established.

Users of the type of circuit breaker herein described have auxiliary items which require energy and to provide for such auxiliary items rotary switch means 310 are provided, as best shown in FIGS. 10, 11 and 12. As there shown, the auxiliary switch arrangement 310 includes a bank of ganged rotary switches 311 which are actuated by a common shaft 312. The shaft 312 is rotated between switch closed, switch open positions in synchronism with the closing and opening of the vacuum switch contacts. The shaft 312 is rotated by a linkage 314 which is connected by means of a rod 316 to a corner of a bell crank 317. The bell crank 317 is pivotally connected as at 318 to the backbone bar 158 and also has a pivotal connection as at 319 to the drive bar 121. Movement of the drive bar 121 to the right, as viewed in FIG. 10, will operate to effect a closing of the vacuum switch contacts and also will rotate the shaft 312 in a direction to actuate the contacts of the ganged rotary switches 311.

An additional set of auxiliary switches 320 are mounted in the enclosure 21 to increase the number of switches available to the user of the switchgear. To this end a second set of ganged rotary switches 321 are mounted in the enclosure 21. Actuation of the set of switches 321 is accomplished by rotating a shaft 322 simultaneously with actuation of the set of switches 310. To this end, rotation of the shaft 322 is accomplished through a linkage 323 driven by a vertical rod 324. The rod 324 extends downwardly within the compartment 26 adjacent the front wall 33, and is supported for rotation about its own axis by a bracket 327 that is carried by the side wall 97. A tubular strike member 328 is welded to the rod 327 in position to be engaged by the end 329 of a horizontally disposed actuating rod 331. As shown in FIG. 11, the end 329 of the rod 331 is guidably supported in a bracket 332 mounted on the rear surface of the back plate 98. The opposite end of the rod 331 is adjustably secured in a bracket 333 that is pivotally connected to a bell crank 334. The bell crank 334 is pivotally supported on a pin 336 mounted in the back plate 98. A rod 337 has one end pivotally secured to the bell crank 334 and has its opposite end pivotally connected, as at 338, to the drive bar 121. Thus, as the drive bar 121 is moved rightwardly, as viewed in FIG. 10, to move the movable vacuum switch contacts to closed positions the rods 316 and 337 are simultaneously pulled downwardly. Downward movement of the rod 316 will effect actuation of the set of auxiliary switches 311 while the downward movement of the rod 337 will effect actuation of the second set of auxiliary switches 320. This is true because as the rod 337 is moved downwardly the bell crank 334 will pivot about the pin 336 effecting rightward movement of the rod 331. Rightward movement of the rod 331 will engage the end 329 with the strike tube 328 forcing the rod 324 to rotate about its own axis. This rotation of the rod 324 is in a direction to effect the operation of the linkage 323 for moving the shaft 322 in a switch actuating direction. Since the end 329 of the rod 331 has no connection with the tubular strike member 328, the retraction of the rod 331 will not effect a rotation of the second set of switches to their original position. For reset purposes, the link 339 of the linkage 323 is provided with an extension 341 to which one end of spring 342 is attached. The opposite end of the spring 342 is attached to the wall 33. Thus, when the rod 331 has effected the rotation of the rod 324 to rotate the switches 321 to an actuated position, the spring 342 will be under tension. The stored energy in the spring 342 will return the switches to their normal positions when the rod 331 is retracted.

A visual indication of the condition of the circuit breaker 22 is available at the front of the mechanism. Such visual indication is afforded by tell-tale flags 351 and 352 shown in FIG. 18. The flag 351 is color coded and imprinted to indicate the condition of the stored energy operator 99. Thus, the flag portion 351A is imprinted with the word "charged." The other portion 351B of the flag 351 is imprinted with the word "discharged." The portion of the flag 351 which indicates the present condition of the stored energy operator 99 is visible through a window 353 provided in the cover 228.

In a similar manner, the flag 352 is color coded and imprinted to indicate the condition of the vacuum switches. Thus, the flag portion 352A is colored green and imprinted with the word "open" to indicate that the contacts of the vacuum switches are in open position. On the other hand the portion 352B of the flag 352 is colored red and imprinted with the word "closed" to indicate that the contacts of the vacuum switches are in closed position.

The flag portion 351A which indicates that the stored energy operator 99 is charged, that is that the closing springs thereof are charged, is moved into registration with the window 353 by the pin 356 engaging the top surface of the flag lever 357. The pin 356 is mounted in the side of a charging ratchet wheel 245 which is rotated in a counterclockwise direction approximately 180° to effect a charging of the closing springs. Thus, the pin 356 moving with the wheel will be moved into engagement with the lever 357 forcing the lever downwardly, as viewed in FIG. 17. The downward movement of the lever 357 will operate to bring the flag portion 351A in registry with the window 353 so that the "charged" condition of the stored energy operator 99 will be visible.

On the other hand, when the closing springs are discharged, they will be rotated to a position as depicted in FIG. 18, wherein the pin 356 is in the position shown. This will release the lever 357 and a spring 358 will operate to pull the lever rearwardly into engagement with a stop pin 359. In this position the flag portion 351B is in registration with the viewing window 353 to clearly indicate the condition of the stored energy operator 99 as being "discharged."

The flag portions 352A and 352B are moved into registry with a viewing window 361 by means of a lever 362. The lever is pivotally supported on the back plate 98 of the stored energy operator 99 so that it is movable in a vertical plane. A spring 363 connected to the flag lever 362 and the back plate 98 normally operates to pull the lever upwardly against a positive stop pin 364 as depicted in FIG. 18. In this position the flag portion 352A, indicating that the contacts of the vacuum switches are in open position, is in registry with the viewing window 361. On the other hand, when the contacts of the vacuum switches are closed the flag lever 362 must be moved downwardly to place the flag portion 352B in registry with the viewing window 361. To this end, a lever 366 is disposed for sliding movement in a slot 367 formed in the back plate 98. The lever 366 has its inner end pivotally connected to the drive bar 121. The free end of the lever 366 receives the end of a tension spring 368 which has its opposite end connected to the flag lever 362. Thus, as the drive bar 121 is moved to close the vacuum switch contacts it will move downwardly. The downward movement of the drive bar 121 causes the lever 366 to move to the right, as viewed in FIG. 18, thereby expanding the spring 368. As a result, the force that the spring 368 now exerts on the lever 362 is greater than the force exerted by the spring 363 and the lever 362 is pulled downwardly to align the flag portion 352B with the viewing window 361.

The embodiments of the invention in which an exclusive property or privilege is claimed are defined as follows:

1. Enclosed switchgear including an enclosure defining a three phase circuit breaker compartment having a longitudinal axis;
   - a plurality of main bus conductors and a plurality of load bus conductors extending into said three phase circuit breaker compartment, said bus conductors being positioned vertically and arranged in a horizontal line;
   - a three phase circuit breaker having a longitudinal axis, said circuit breaker being movable into and out of said circuit breaker compartment in a direction parallel to its longitudinal axis, said circuit breaker being provided with a plurality of vacuum interrupters arranged vertically in a single horizontal line parallel to the longitudinal axis of said circuit breaker, one for each associated bus conductor;
   - means on each vacuum interrupter for establishing an electrical connection between said vacuum interrupter and an associated bus conductor; and,
   - means operable to move said three phase circuit breaker vertically bodily within said circuit breaker compartment to effect engagement of said means on each of said vacuum interrupters with associated ones of said bus conductors to establish electrical engagement therebetween.

2. Enclosed switchgear according to claim 1 wherein said circuit breaker includes an operator connected to effect opening and closing of said vacuum interrupters, said operator including trip-free linkage operable when actuated to effect the closing of said vacuum interrupters, said operator having stored energy means operable when released to actuate said trip-free linkage in a vacuum interrupter closing operation, said operator being further provided with releasable stop means associated with said stored energy means to maintain said stored energy means in charged condition; and,
   - a vacuum interrupter opening interlock means carried by said circuit breaker, said opening interlock being normally operable to prevent the full entry of said circuit breaker into said circuit breaker compartment, said opening interlock when actuated to permit full entry of said circuit breaker into said circuit breaker compartment being operably connected to effect a collapse of said trip-free linkage so that said vacuum interrupters will open if closed;
   - whereby said vacuum interrupters are open prior to full entry of said circuit breaker into said circuit breaker compartment.

3. Enclosed switchgear according to claim 2 wherein said vacuum switch interlock means comprises a bar member movably carried by said circuit breaker and normally biased into a position to interfere with the full entry of said circuit breaker into said circuit breaker compartment;
   - a movable trip means operable when actuated to trip said operator for opening said vacuum interrupters, said trip means being carried by said circuit in position to be actuated by the movement of said interlock bar to a noninterfering position; and,
   - operable means carried by said circuit breaker to restore said trip means to its normal position when said interlock bar is biased to its normal position.

4. Enclosed switchgear according to claim 3 wherein said operator includes a trip lever operable when actuated to release said vacuum interrupter opening means to open said vacuum interrupters;
   - said trip means includes a rod movably carried by said circuit breaker in position to engage and actuate said operator trip lever; and,
   - a pivotal member carried by said circuit breaker in position to be actuated by said interlock bar when said interlock bar is moved to a noninterfering position, said pivotal member being operatively connected to said trip rod;
   - whereby the movement of said vacuum interrupter interlock bar to a noninterfering position will effect the movement of said trip rod to actuate said trip lever for releasing opening means to open said vacuum interrupters.

5. Enclosed switchgear according to claim 2 wherein there is further provided a stored energy interlock normally biased into a position of sensing the entry of said circuit breaker into said circuit breaker compartment, said stored energy interlock being displaceable by the entry of said circuit breaker into said compartment; and,
   - release means carried by said operator and operably connected to effect a release of said stop means associated with said stored energy, means to effect a release of the energy stored therein, said release means being actuated by the displacement of said stored energy interlock upon the entry of said circuit breaker into said circuit breaker compartment.

6. Enclosed switchgear according to claim 5 wherein said stored energy interlock is biased to its initial position after said circuit breaker is fully entered into said circuit breaker compartment, said stored energy interlock being operable to latch said circuit breaker in disconnected position within said circuit breaker compartment.

7. Enclosed switchgear according to claim 1 wherein said circuit breaker compartment is provided with a rating sensing interlock; and,
said circuit breaker is provided with rating code means that is sensed by the rating interlock of said circuit breaker compartment prior to full entry of said circuit breaker into said compartment;
whereby a circuit breaker of one rating cannot be entered into the circuit breaker compartment unless the rating of the circuit breaker corresponds to the rating of the enclosure.

8. Enclosed switchgear according to claim 7 wherein said means operable to move said circuit breaker bodily vertically to elevate said circuit breaker includes a ball screw and nut drive operatively connected to develop a lifting force between said enclosure and said circuit breaker to elevate said circuit breaker bodily within said circuit breaker compartment for effecting electrical connection between said vacuum interrupters and said load and main bus conductors.

9. Enclosed switchgear according to claim 8 wherein said circuit breaker includes a mobile carriage on which said vacuum interrupters are operatively mounted;
elevating means carried by said carriage and engageable with said enclosure within the interior of said circuit breaker compartment for effecting the elevation of said carriage bodily to engage said vacuum interrupters with said bus conductors; and,
said ball screw and nut drive being operatively connected to actuate said elevating means.

10. Enclosed switchgear according to claim 9 wherein there is provided means on said carriage engageable with means secured to said enclosure within said circuit breaker compartment to maintain said circuit breaker in position as it is being elevated into connected position.

11. Enclosed switchgear according to claim 10 wherein said circuit breaker compartment includes trackways on each side thereof; and,
said elevating means includes rollers engageable in said trackways;
whereby entry of said circuit breaker into said circuit breaker compartment will engage said rollers in said trackways to effect a connection of said elevating means with said enclosure.

12. Enclosed switchgear according to claim 11 wherein there is provided a pivotally displaceable shutter mechanism normally disposed to block access to said depending ends of said load and main bus conductors from within said circuit breaker compartment;
shutter operating means carried by said enclosure within said circuit breaker compartment and operably connected to pivotally move said shutter mechanism out of its blocking position when actuated; and,
means carried by said circuit breaker in position to couple with said shutter operating means for effecting the actuation of said shutter operating means as said circuit breaker is elevated into connected position with said bus conductors.

13. Enclosed switchgear according to claim 9 wherein said elevating means includes a tubular shaft carried by said circuit breaker on one side thereof;
a pair of spaced apart shafts disposed transversely relative to the longitudinal axis of said circuit breaker, said transversely disposed shafts being supported for rotation about their own axes;
at least two elevating arms on the said one side of said circuit breaker, said arms being connected to said tubular shaft in a manner to be rotated by the axial movement of said tubular shaft, each of said arms being fixedly secured to an associated transversely disposed shaft in a manner that rotation of said arms will effect rotation of said transversely disposed shafts, about their own axes;
at least two other elevating arms disposed on the opposite side of said circuit breaker, each of said other elevating arms being fixedly secured to an associated transversely disposed shaft; and,
means securing said recirculating ball nut to said tubular shaft so that operation of said ball screw and nut operates to effect the axial movement of said tubular shaft relative to said ball screw to thereby rotate said first elevating arms and effect simultaneous rotation of said transversely disposed shafts which effect the rotation of said other elevating arms;
whereby said elevating arms operate in unison to elevate said circuit breaker.

14. Enclosed switchgear according to claim 13 wherein said ball screw includes means operative to resist rotation of said ball screw in a direction opposite to the circuit breaker elevating direction of rotation of said ball screw.

15. Enclosed switchgear according to claim 14 wherein said means operative to resist rotation of said ball screw in a direction opposite to the circuit breaker elevating direction of rotation of said ball screw is a one-way clutch member;
whereby said circuit breaker in an elevated position cannot by its own weight backdrive said ball screw.

16. Enclosed switchgear according to claim 9 wherein there is provided an input drive to said ball screw including a torque limiting drive clutch for limiting the input to said ball screw;
whereby resistance to the operation of said recirculating ball screw and nut drive due to malfunction of components or improper disposition of components which would damage the device is alleviated by the slipping of said torque limiting drive clutch.

17. Enclosed switchgear including an enclosure defining a three phase circuit breaker compartment;
a plurality of main bus conductors and a plurality of load bus conductors extending into said circuit breaker compartment, said bus conductors being arranged vertically in a line and entering said compartment from the top thereof;
a three phase circuit breaker having a plurality of vacuum interrupters arranged vertically in a line, one for each associated bus conductor, said circuit breaker including a frame having wheel means for guideable movement of said circuit breaker;
a ball screw and nut drive operably connected to elevate said circuit breaker bodily within said circuit breaker compartment to effect engagement of said vacuum interrupters with associated ones of said bus conductors to establish electrical engagement therebetween;

an operator connected to effect opening and closing of said vacuum interrupters, said operator including trip-free linkage operable when actuated to effect the closing of said vacuum interrupters; said operator having stored energy means operable when released by the operation of said trip-free linkage in a vacuum interrupter closing operation;

a vacuum interrupter opening interlock means comprising a bar member movably carried by said circuit breaker and normally biased into a position to interfere with the full entry of said circuit breaker into said circuit breaker compartment;

a movable trip means operable when actuated to trip said trip-free linkage for opening said vacuum interrupters, said trip means being carried by said circuit in position to be actuated by the movement of said interlock bar to a noninterfering position;

operable means carried by said circuit breaker to restore said trip means to its normal position when said interlock bar is biased to its normal position;

an interlock rod carried by said circuit breaker for axial movement into and out of engagement with said interlock bar member; and, means operatively connected to said interlock rod to bias said rod into a position of engagement with said trip means when said interlock bar member has been moved to a noninterfering position to thereby insure that said movable trip means is actuated to trip said trip-free linkage and maintained in such position so that said vacuum interrupters are maintained opened as said ball screw and nut drive operates to elevate said circuit breaker into connected position.

18. Enclosed switchgear according to claim 17 wherein there is provided actuating means operated in synchronism with said ball screw to engage with and effect the displacement of said interlock bar to its noninterfering position.

19. Enclosed switchgear according to claim 18 wherein said ball screw and nut drive includes an actuating member movable with said nut and disposed to engage with said interlock rod to effect a disengagement of said interlock rod from said interlock bar to release said interlock bar so that said interlock bar is biased to its normal position thereby releasing said movable trip means to thereby free said trip-free linkage for operation.

20. Enclosed switchgear according to claim 19 wherein there is provided means for restoring said interlock rod into engagement with said interlock bar when said interlock bar has been moved to a noninterfering position upon operation of said ball screw and nut drive operating to lower said circuit breaker to a disconnected position;

whereby said trip means is actuated to thereby trip said trip-free linkage to insure that said vacuum interrupters are open as said circuit breaker is lowered to a disconnected position.

21. Enclosed switchgear according to claim 18 wherein said ball screw and nut drive mechanism includes an abutment member movable with the axial movement of said nut;

a first abutment on said interlock rod cooperable with said abutment associated with said nut to maintain said interlock rod in a retracted position when said circuit breaker is in a lowered disconnected position;

a first spring operably connected to said interlock rod in a manner to exert a force thereon to urge said interlock rod in a direction of engagement with said interlock bar;

a second abutment on said interlock rod engageable by said abutment member associated with said nut to move said interlock rod to effect a release of said interlock bar to thereby free said trip-free linkage for operation; and, a second spring operably connected to said interlock rod in a manner to exert a force on said interlock rod in a direction opposite to the direction in which said first spring urges said interlock rod, the force exerted by said second spring on said interlock rod being substantially equal to the force that said first spring exerts on said interlock rod;

whereby operation of said ball screw and nut drive to elevate said circuit breaker into connected position releases said interlock rod for movement under the influence of said first spring into engagement with said interlock bar to hold said interlock bar in its noninterference position to thereby insure that said trip means is actuated to trip said trip-free linkage and to maintain said trip-free linkage tripped to thereby insure that said vacuum interrupters are opened as said circuit breaker is elevated into connected position, and after said circuit breaker has been elevated into connected position said ball screw and nut drive will move said abutment member associated with said nut into engagement with said second abutment on said interlock rod and move said interlock rod into a position wherein said interlock bar is released and returns to its normal position thereby releasing said trip means to free said trip-free linkage for operation, and when said ball screw and nut drive is operated in a direction to effect the lowering of said circuit breaker to disconnected position, said abutment associated with said nut is moved in a direction to disengage from said second abutment on said interlock rod and said second spring operates to urge said interlock rod into engagement with said interlock bar for maintaining said interlock bar in its noninterfering position wherein said trip-free linkage is tripped and said vacuum interrupters are opened and maintained open during the disconnecting movement of said circuit breaker, said abutment associated with said nut engaging with said first abutment on said interlock rod to effect the movement of said interlock rod to its original position after said circuit breaker is in a lowered disconnected position.

22. Enclosed switchgear having a compartment adapted to receive a circuit breaker provided with a plurality of vacuum interrupters having open and closed positions, said circuit breaker also having a vacuum interrupter operator connected to effect the opening and closing of said vacuum interrupters;

a set of ganged secondary auxiliary switches disposed within said compartment, said set of ganged secondary switches being constructed and arranged to be operated by a common actuator; and, mechanical means operably connected between said vacuum interrupter operator and said common actuator of said ganged secondary set of auxiliary switches for actuating said common actuator when said vacuum interrupter operator opens or closes said vacuum interrupters.

23. Enclosed switchgear including an enclosure defining a plurality of vertically tiered compartments;
- a first of said tiered compartments being adapted to receive a three-phase circuit breaker;
- a second of said tiered compartments above said circuit breaker compartment;
- a plurality of relatively long insulators supported by said second of said tiered compartments and extending in opposite directions therefrom;
- a plurality of main bus conductors, one for each phase entering into said second compartment through associated ones of said insulators and extending downwardly therefrom into said circuit breaker compartment;
- a third of said tiered compartments above said second compartment;
- a plurality of main load bus conductors, one for each phase extending through associated ones of said insulators from said third compartment through said second compartment into said circuit breaker compartment;
- at least one toroidal current transformer encompassing each of said insulators and supported by said second of said tiered compartments;
- a circuit breaker having a plurality of vacuum interrupters, one for each bus conductor, said vacuum interrupters being connectable with said bus conductors; and,
- operating means operable to elevate said circuit breaker within said circuit breaker compartment to connect said vacuum interrupters with associated ones of said bus conductors.

* * * * *